(12) United States Patent
Shi

(10) Patent No.: US 6,807,163 B1
(45) Date of Patent: Oct. 19, 2004

(54) ADAPTIVE RATE CHANNEL SCANNING METHOD FOR TDMA WIRELESS COMMUNICATIONS

(75) Inventor: Hong Shi, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/283,684

(22) Filed: Apr. 1, 1999

(51) Int. Cl.[7] .............................................. H04B 7/212
(52) U.S. Cl. ...................... 370/337; 370/347; 455/434
(58) Field of Search ................... 370/310, 311, 370/329, 337, 344, 347, 431, 437, 442; 455/421, 436, 434, 450, 524, 132, 133, 135

(56) References Cited

U.S. PATENT DOCUMENTS

| | | | | |
|---|---|---|---|---|
| 4,977,612 A | * | 12/1990 | Wilson | .................... 455/166.1 |
| 5,524,280 A | * | 6/1996 | Douthitt et al. | ............... 455/62 |
| 5,539,748 A | * | 7/1996 | Raith | ......................... 340/7.34 |
| 5,603,081 A | * | 2/1997 | Raith et al. | ................. 370/337 |
| 5,613,208 A | * | 3/1997 | Blackman et al. | ......... 340/7.36 |
| 5,754,956 A | * | 5/1998 | Abreu et al. | ................ 425/525 |
| 5,799,256 A | * | 8/1998 | Pombo et al. | ......... 340/825.49 |
| 5,822,681 A | * | 10/1998 | Chang et al. | ............... 455/452 |
| 5,956,638 A | * | 9/1999 | Chang et al. | ............... 455/452 |
| 6,011,960 A | * | 1/2000 | Yamada et al. | ............. 455/434 |
| 6,047,175 A | * | 4/2000 | Trompower | ................. 455/422 |
| 6,052,590 A | * | 4/2000 | Hicks et al. | ............. 455/161.1 |

* cited by examiner

*Primary Examiner*—Frank Duong
(74) *Attorney, Agent, or Firm*—Moore & Van Allen PLLC

(57) ABSTRACT

An apparatus and method for adaptive channel scanning in a TDMA radio communication system (100) allows a mobile station (106) to respond to the operating environment of the radio communication system. The mobile station or handset detects the operating environment of the handset and adjusts a scan rate interval (SRI) (412) in response to the operating environment. After the scan rate interval has elapsed, the handset scans one of the predetermined subset of channels and a full set of channels of the plurality of radio channels.

18 Claims, 5 Drawing Sheets

ADAPTIVE RATE CHANNEL SCANNING METHOD FOR TDMA WIRELESS COMMUNICATIONS

BACKGROUND

The present invention is generally related to wireless communication systems. More particularly, the present invention is related to a channel scanning method for use in a wireless communication system.

In wireless communication systems a mobile station establishes radio communication with a fixed station. The mobile station may also be referred to as a handset or portable part (PP) and is typically battery-powered for mobility. The fixed station may also be referred to as a radio fixed part (RFP) or base station. The fixed station may be part of a network such stations including a network controller.

Radio communication occurs over a plurality of channels. In a time division multiple access (TDMA) system, a plurality of carriers transmits information during time slots of predetermined duration. Each one-way channel is defined by a time slot and a carrier. A two-way or duplex link is defined by two non-adjacent time slots on the same carrier.

Channels must be selected and may be changed according to predetermined rules. As the mobile station moves, it may experience noise or other interference. As the mobile station moves from the vicinity of one base station to the vicinity of another base station, it may have to begin communication with the other base station on another channel, in a process called handover. To select and change channels requires a knowledge of available channels.

In some wireless systems, channel selection is assigned to the mobile station, rather than the system. This is true in handsets operating in unlicensed personal communication system (PCS) bands at 1920–1930 MHz under regulations of the U.S. Federal Communications Commission (FCC). The handset uses an otherwise idle time slot to search the radio environment for activity. The result of this scanning is stored in a channel history database. When interference is encountered or the handset moves around the system coverage area, the handset will dynamically select a better channel from the channel history database. A channel switch or channel handover will then occur.

This process is known as dynamic channel selection (DCS). An important sub-process of DCS is channel scanning. The handset channel scanning process is performed both during an active call and during standby. As a result, the channel scanning process is a major determining factor of handset battery life.

The need to scan the radio environment creates a design tradeoff. By scanning as frequently as possible, the most current radio environment information can be maintained. As a result, a more reliable channel database is maintained for proper channel selection. However, the negative side of a high channel scan rate is high power consumption and concomitant reduced battery life of the handset.

Conventional channel scanning methods use a fixed scan interval. In one implementation, a complete channel scan is performed every 128 frames, where each frame includes 24 time slots. This conventional method faces limitation when the radio environment changes rapidly, for example, when the handset user moves quickly from one cell coverage area to another coverage area or the interference level rises suddenly. In such an instance, the scan interval may be too long to keep up with the rapidly changing environment. The channel information and the channel history database might not reflect the actual channel conditions at a particular time. The consequence is a delay in channel selection, noisy communication including high bit error rate and even dropped calls. On the other end, when the radio environment changes very slowly the fixed scan rate may be too high. For example, when the handset user and handset are stationary in a quiet office, the channel data does not change much from scan to scan. In that case, the scan rate is too high and channel scanning consumes battery power unnecessarily.

Accordingly, there is a need for an improved channel scanning technique which balances the need for current radio environment information and the need for reduced battery consumption.

DETAILED DESCRIPTION OF THE PRESENTLY PREFERRED EMBODIMENTS

Figure 1:
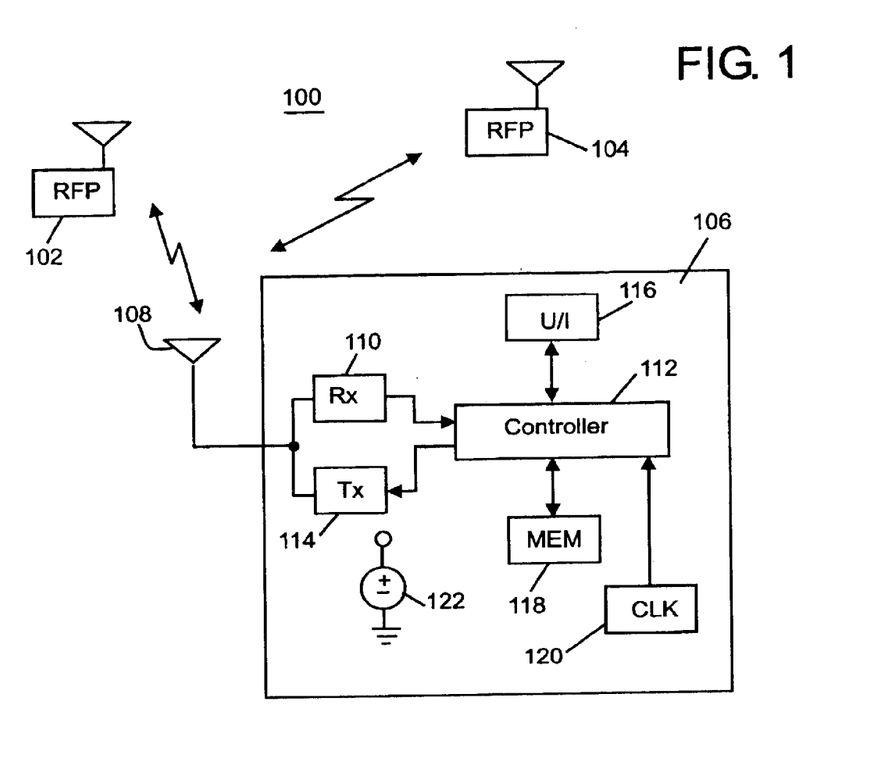
FIG. 1 is a block diagram of a radio communication system.

Referring now to the drawing, FIG. 1 shows a block diagram of a radio communication system 100. The system 100 includes a plurality of base stations such as base station 102 and base station 104 and one or more mobile stations such as mobile station 106. The base stations 102, 104 may also be referred to as fixed parts, radio fixed parts, or RFP. Each of the base stations 102, 104 provides two-way radio communication to a geographic area adjacent to the base station 102, 104. The base stations 102, 104 may be linked through a network which includes a network controller to provide features such as handover of communication with the mobile station 106 between one base station and another base station.

The mobile station 106 is configured for two-way radio communication with a base station, such as base stations 102, 104 in the system 100. The mobile station is also referred to as a handset, portable part or PP. The mobile station 106 includes an antenna 108, a receiver 110, a controller 112, a transmitter 114. a user interface 116, a memory 118, and a clock 120. Operating power for the mobile station 106 is provided by a battery 122. The receiver 110 receives radio frequency (RF) signals transmitted by base stations in the system, including base stations 102, 104. The receiver 110 converts the received RF signals to digital data for use by the controller 112. The controller 112 operates in conjunction with data and instructions stored in the memory 118 to control operation of the mobile station 106. The controller 112 may be implemented as a microprocessor, digital signal processor, hard-wired logic and analog circuitry, or any suitable combination of these. The memory 118 may include semiconductor memory such as EEPROM and RAM and other suitable storage devices.

For transmitting data, the data are provided to the transmitter 114 for conversion from data to RF signals, which are then provided to the antenna 108. The user interface 116 allows control of the mobile station 106 by a user. In a typical embodiment, the user interface 116 includes a keypad, a display, a microphone and a speaker. The clock 120 provides timing signals to the controller 112.

Figure 2:
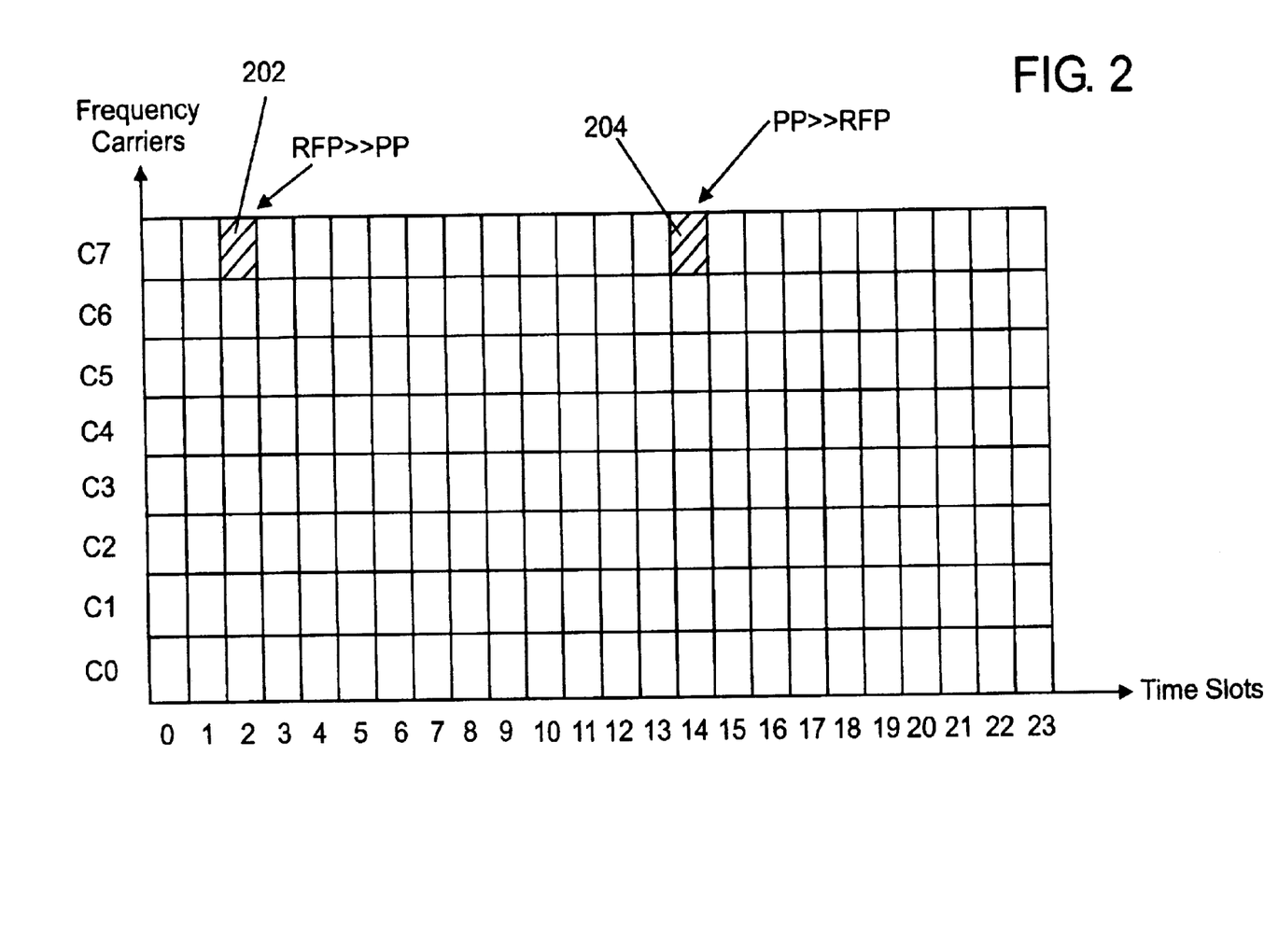
FIG. 2 is a diagram illustrating channel space in the radio communication system of FIG. 1.

In the illustrated embodiment, the system 100 is a multiple carrier, time division multiple access (TDMA), time division duplex (TDD) system. FIG. 2 illustrates the channel space for the system 100 of FIG. 1. The channel space is arranged as a channel grid, with carriers labeled $C_0$ through $C_7$. Disposed along the ordinate and time slots disposed along the abscissa. The carriers may be positioned at any suitable radio frequency. In one embodiment, the eight carriers are located on adjacent channels, separated by suitable channel spacing. In the illustrated embodiment, consecutive time slots, labeled 0 to 23, form a frame.

For two-way communication, a duplex channel is defined as a time slot pair spaced by 12 time slots on the same frequency carrier. In FIG. 2, time slot 202 is transmitted by a base station (RFP) in the radio communication system 100 of FIG. 1 and received by a mobile station (PP). The time slot 202 is located at position 2 in the frame. Twelve time slots later, time slot 204 is assigned for radio communication from the mobile station (PP) to the base station (RFP). The time slot 204 is located at position 14 in the frame. Other spacings of time slots in the system may be specified. The time slot spacing of the time slots assigned for the duplex link is exemplary only.

Figure 3:
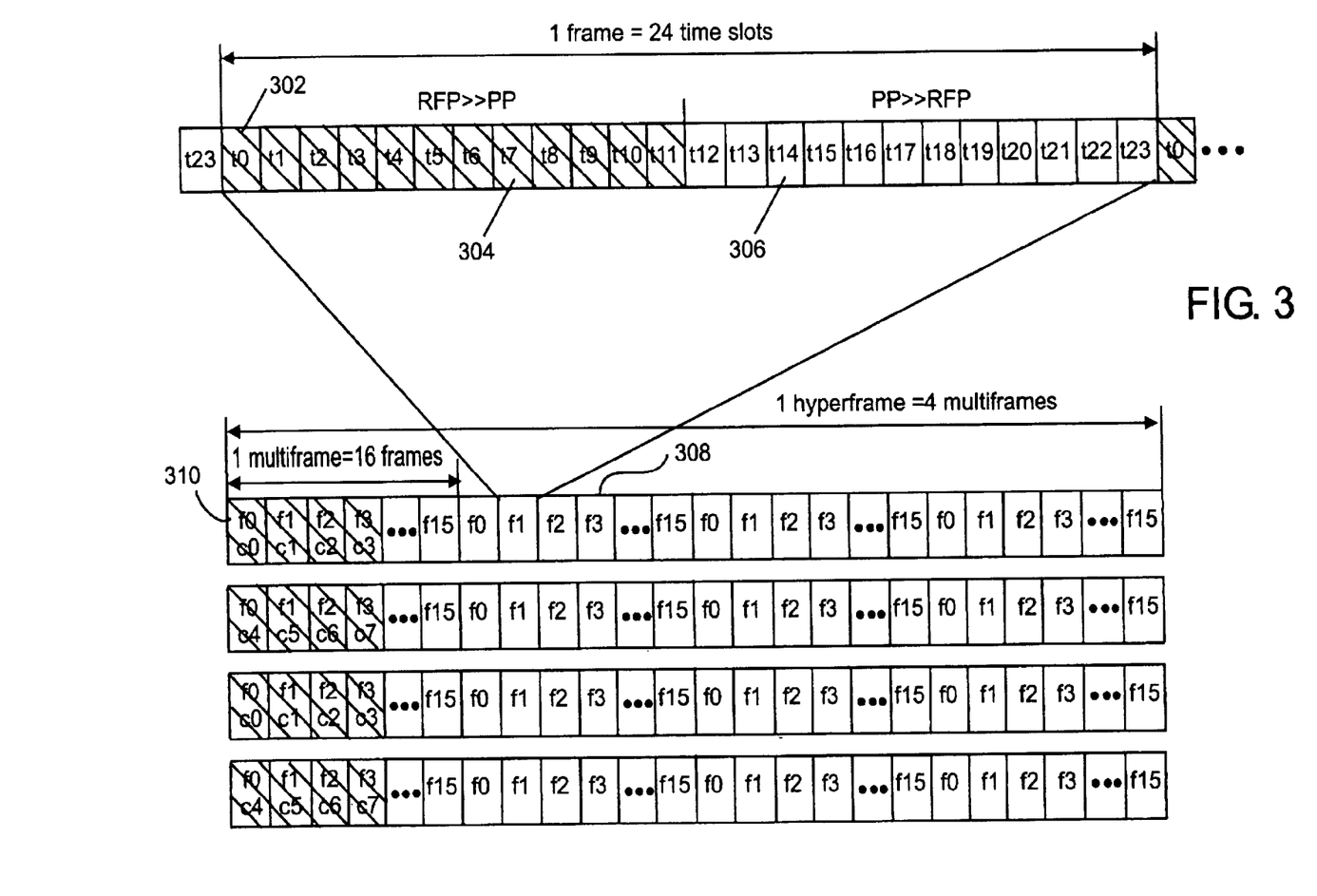
FIG. 3 illustrates frame structure in the radio communication system of FIG. 1.

FIG. 3 illustrates frame structure for the radio communication system of FIG. 1. In FIG. 3, a frame 302 includes downlink time slots 304 and uplink time slots 306. The downlink time slots are used for communication from the base station to the mobile station and the uplink time slots 306 are used for communication from the mobile station to the base station. While not illustrated in FIG. 3, each frame 302 includes transmission on a plurality of carriers, such as the eight carriers illustrated in FIG. 2. As is further illustrated in FIG. 3, 16 frames such as frame 302 combine to form one multiframe 308. Four multiframes together form one hyperframe 310.

The communication system 100 of FIG. 1 employs channel selection by the handset or mobile station in a process known as dynamic channel selection (DCS). The mobile station uses idle time slots, when the mobile station is not actively communicating with a base station, to search the radio environment for other available radio channels.

The handset maintains in memory, such as the memory 118 of FIG. 1, a channel history table containing information about other available radio channels. The information stored includes, for example, the identity of the base station to which the mobile station is currently locked, a received signal strength indication (RSSI) for available base stations, an indication of a specific channel which is the least interfered with for a given base station, and an indication of quality of the channel. The mobile station will lock to a particular base station for time synchronization, authentication and for location by the system to transmit a paging signal to notify the mobile station of an incoming call for the mobile station. RSSI is an indication of how strong or how close a base station is relative to the mobile station. Channel interference is determined by detecting at the mobile station RF power and determining if the RF power in that time slot on that carrier is relatively high or low. If the RF power is low, interference on that channel is low. Quality of the channel is an indication that, even though the signal on the channel may be strong, there may also be interference on the channel, for example due to multipath interference.

During each scan, the mobile station tunes the receiver to the appropriate carrier, detects the RF energy on that carrier during an appropriate time slot, demodulates and decodes the RF energy and determines activity on the channel. If this process is repeated on each carrier during each time slot of each frame of each multiframe of each hyperframe, the mobile station including the receiver will be powered up and dissipating current during substantial amounts of time. This may be desirable during certain conditions such as times of high interference or when the mobile station is in a handover condition. However, at times when the mobile station is stationary or in a low interference environment, doing a full scan as described above of all possible channels can be wasteful of battery power. In order to increase user convenience, it is desirable to maximize operating time by minimizing power dissipation from the battery which powers the mobile station.

Figure 4:
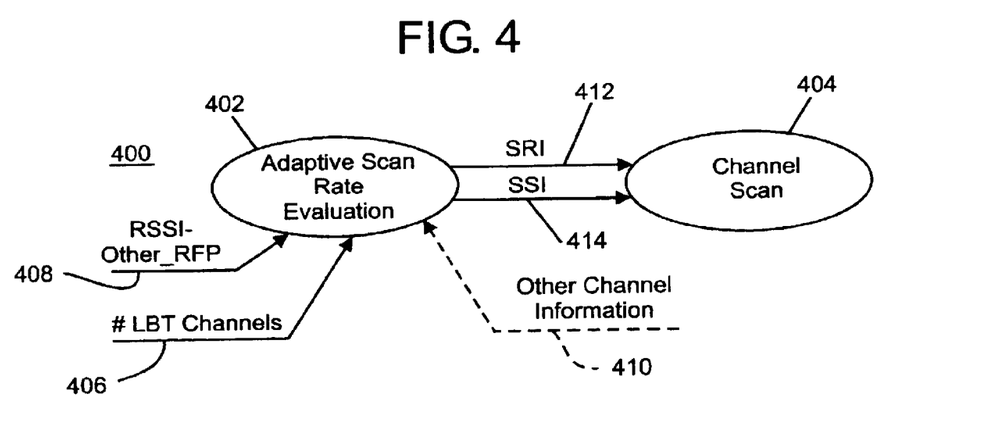
FIG. 4 illustrates an improved adaptive rate channel scanning method.

FIG. 4 is a diagram illustrating an improved adaptive rate channel scanning method 400. The method 400 includes an adaptive scan rate evaluation process 402 and a channel scan process 404. These processes are typically implemented as software instructions and data stored in memory for execution by a processor of the mobile station. However, other implementations are possible, including combinations of hardware and software suitable for performing the necessary functions.

The adaptive scan rate evaluation process 402 receives as inputs a number of listen before talk (LBT) channels 406, RSSI information 408, and other channel information 410. The process 402 operates on data stored in a channel history table during the previous channel scanned by the channel scan process 404. The process 402 determines if there are any other base stations (RFPs) for which the RSSI exceeds the RSSI of the currently locked base station by a value M dB. This condition monitors the user mobility in the system. If the user of the handset is moving toward the overlap area of the cells, the scan rate should be increased to capture the handover moment.

Also, the process 402 determines if there is a substantial number of a LBT channels in two carriers nearest the frequency band edge. According to FCC regulations, for wideband PCS systems, mobile stations operating in the unlicensed PCS band (1920–1930 MHz) must begin scanning for channels at the high band edge, for example, nearest 1930 MHz. In narrow band PCS systems in this band, the mobile station must start using a channel from the carrier nearest the low band edge, for example, 1920 MHz. The exemplary embodiment shown here is a wideband PCS system. Thus, the scan for free channels begins at 1930 MHz and steps downward in frequency. If the mobile station locates a free channel in the first two carriers (LBT channels) the mobile station must begin communicating on the located channel. If there is a substantial number of LBT channels in these two frequency carriers, it implies that the traffic level or interference level is relatively low. Then, the channel scan rate can be set to a minimum. Otherwise, if there is not a substantial number of LBT channels in the two band edge carriers, but there are a substantial number of a LBT channels across all the frequency carriers, it implies that the traffic level or interference level is moderate. In that case, the channel scan rate can be reduced. If all these conditions do not exist, meaning that either the user is in a cell overlap area or the traffic level and interference level are high, the channel scan rate should be set high.

The process 402 determines a scan rate interval (SRI) 412 and a short scan indicator (SSI) 414. These two parameters are provided to the channel scan process 404.

The channel scan process 404 sets a channel scan timer and executes the channel scan task. The channel scan interval, and inversely the channel scan rate, are controlled by the channel scan timer. The duration of the timer is adjusted according to the SRI 414 value. SSI 414 is used by the channel scan process 404 to determine whether the next scan should be a short scan or a normal scan. Since the values for SRI 412 and SSI are adaptive, meaning that they are varied in response to the operating environment of the mobile station, the channel scan interval and scan rate are therefore adaptive.

Figure 5:
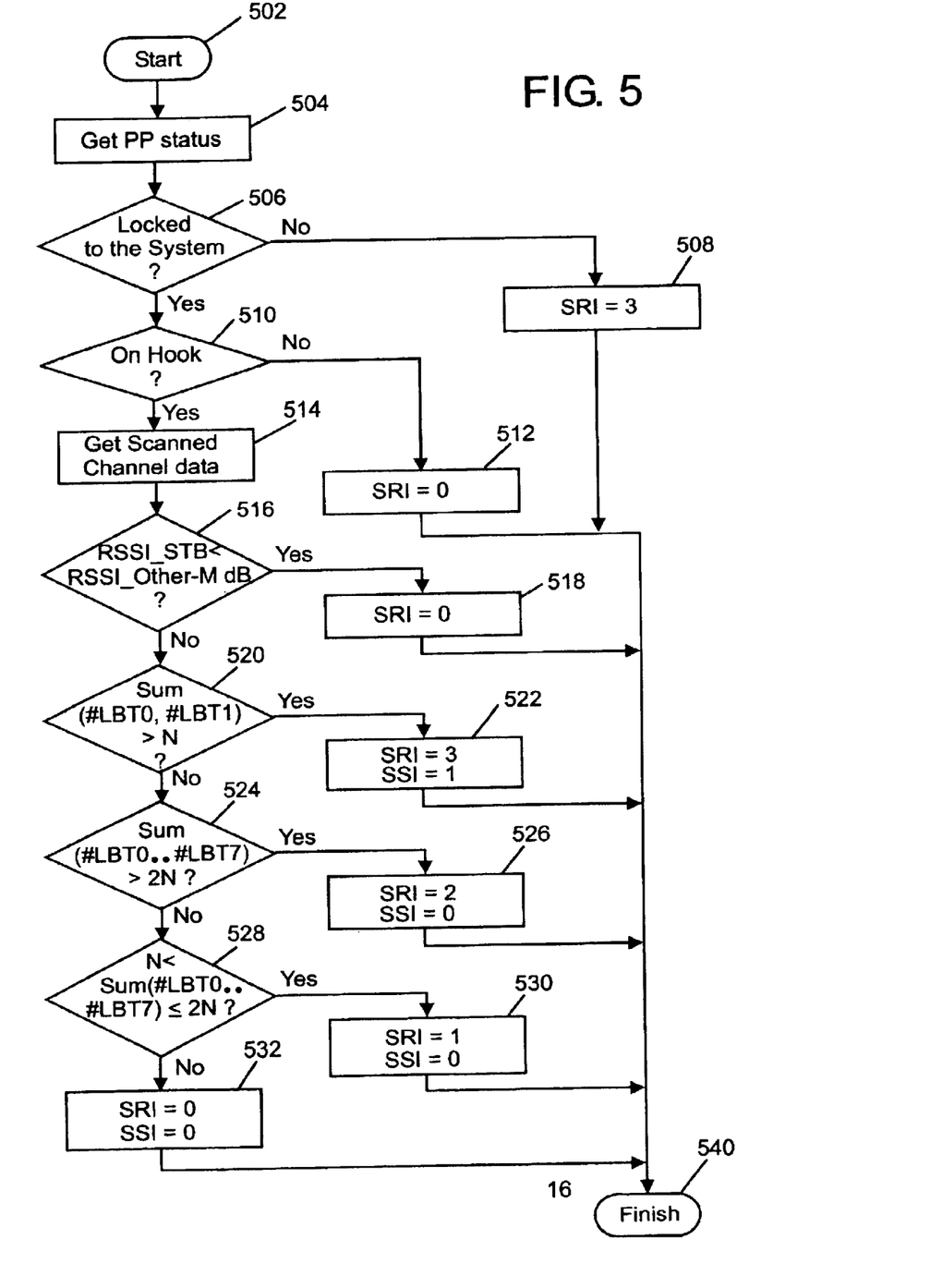
FIG. 5 is a flow diagram illustrating an adaptive scan rate evaluation method.

FIG. 5 is a flow diagram illustrating an adaptive scan rate evaluation method. The method corresponds to the adaptive scan rate evaluation process 402 of FIG. 400. The method is performed by, for example the controller 112 of the mobile station 106 of FIG. 1. The method begins at step 502.

At step 504, status information for the mobile station (PP) is obtained. In the idle, unlocked state, the mobile station is not engaged in a call with a remote base station and is not locked to any base station. In the active, unlocked state, the mobile station is actively searching for a base station to lock itself to. In the idle, locked state, the mobile station is not engaged in a call and is locked to a base station. In the active, locked state, the mobile station is actively engaged in a call and is locked to the base station.

At step 506, using the handset status information obtained in step 504, it is determined if the handset is locked to the system. If not, at step 508, the parameter SRI is set equal to three. The method then terminates at step 540. In the preferred embodiment, the scan rate interval (SRI) is an integer in the range from 0 to 3. This parameter is set according to the process data produced by channel scanning. The default value of SRI is 0. The value of SRI is used to control the relative scan rate or the duration of the scan interval. When SRI is set to a maximum value (for example, 3) the duration of the scan interval is maximized. Conversely, when SRI is set to its minimum value (for example, 0) the scan interval is minimized.

If at step 506 it was determined that the handset is locked to the system, at step 510 it is determined if the mobile station is on hook, for example, whether or not the mobile station is actively engaged in a call with a remote base station. If the mobile station is not on hook, meaning the mobile station is engaged in an active call, at step 512 SRI is set to 0, the minimum value, and at step 540 the method terminates. If, at step 510 the mobile station is on hook, it indicates that the mobile station is idle or not engaged in an active call.

At step 514 since the mobile station has an on-hook status, the scanned channel data are retrieved from the channel history database. This database may be stored in a memory at the mobile station, such as the memory 118 illustrated in FIG. 1. This database contains information about channels available in the system, including base station signal strength, interference levels and channel quality. This information was stored during a previous scan, for example during the immediately previous scan of the channels by the mobile station.

At step 516, it is determined if the average received signal strength indication (RSSI) for a standby (STB) channel of the current base station with which the mobile station currently communicates is smaller than any other average RSSI value of any other base station in the system. Moreover, the comparison of step 516 requires that the other base station have an RSSI value that exceeds the current base station by M dB. Step 516 is addressing a handover condition where the mobile station is preparing to initiate communication with a new base station and terminate communication with the previous base station because the mobile station is moving out of the coverage area of the previous base station and into the coverage area of the new base station. The constant value M serves as a damper level to limit unnecessary handover. Only if the RSSI value for the new base station exceeds the RSSI value for the previous base station by at least the value M would the handover occur.

At step 518, since this condition is true, SRI is set equal to the minimum value of 0. This minimizes the scan rate interval and maximizes the channel data update rate to ensure that the mobile station has the most up current information about the radio environment during the handover condition.

If the condition of step 516 is not true, at step 520 the method checks if the total number of LBT channels of frequency carrier number 0 and 1 are more than N, where N is a constant which can be determined for the particular case. An LBT channel is a channel at a predefined time slot and carrier location in the channel space having an average RSSI value below a predefined lower threshold. According to FCC rules, LBT channels have RSSI less than −85 dBm. Step 520 sums the number of LBT channels for the first two carriers at the edge of the frequency band under consideration. In one example the frequency band is the unlicensed PCS band between 1920 and 1930 MHz.

If the test of step 520 is satisfied, at step 522 SRI is set equal to 3 to maximize the scan rate interval. Also, the short scan indicator (SSI) is set equal to 1. In the illustrated embodiment, SSI is an integer ranging from 0 to 1 and is set according to processing of data produced by channel scanning. The default value for SSI is 0. SSI is used to limit the channel scanning of the mobile station to the carriers at the edge of the frequency band, designated herein as carrier 0 and carrier 1. The check of step 520 ensures that a certain number (N) of LBT channels will be available during a future step when the mobile station tries to initiate communication using one of the LBT channels. If N was set equal to 1, meaning only one LBT channel may be available, a conflict could occur if another mobile station in the system simultaneously scanned for LBT channels and seized the channel prior to its seizure by the mobile station. Setting N to a value greater than 1 further ensures that an LBT channel will be available even in the event of interference, poor quality, or other reasons.

At step 524, it is determined if the total number of LBT channels of all frequency carriers is more than 2N. Again N is a constant which can be appropriately determined. Other values not related to N may be used as well. If the test of step 524 is passed, at step 526, SRI is set equal to 2 and SSI is set equal to 0. Thus, if the total number of LBT channels in all carriers is a substantial number (for example, greater than 2N), then the scan rate interval (SRI) is reduced but a full scan would still be performed. The scan rate interval is set to an intermediate level indicated by the value 2. The method then concludes at step 540.

At step 528, the method determines if the total number of LBT channels of all frequency carriers is between N and 2N. If so, at step 530, SRI is set equal to 1 and SSI is set equal to 0. In this situation, the scan rate interval is decreased because there are relatively fewer LBT channels available in the available spectrum.

At step 532, if the test of step 528 fails, SRI is set to the default value of 0 and SSI is set to the default value of 0. The method completes at step 540. After step 540, the values of SRI and SSI have been established and are passed to the channel scan process 404 of FIG. 4.

Figure 6:
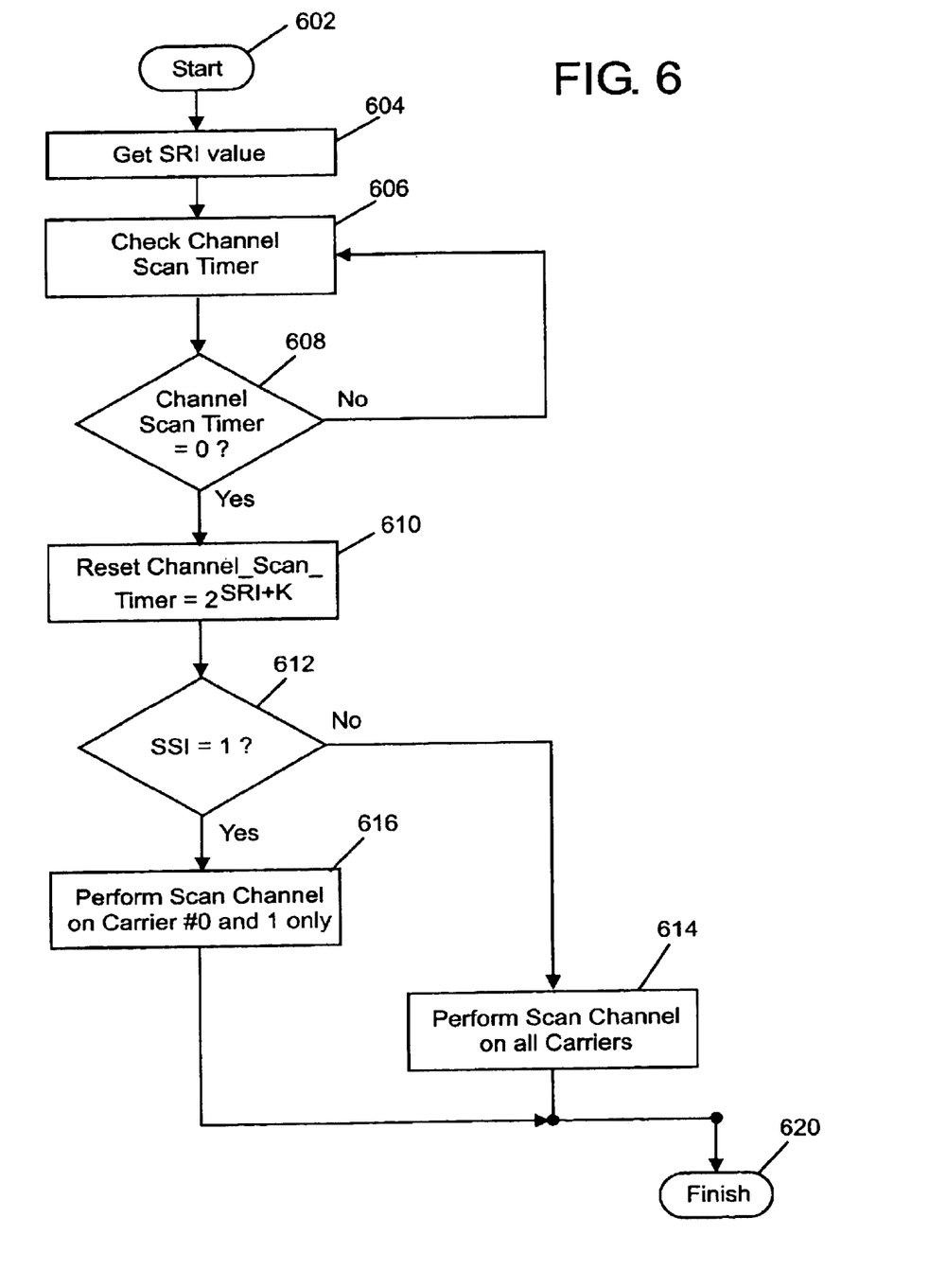
FIG. 6 is flow diagram showing an adaptive channel scanning method.

FIG. 6 illustrates an adaptive channel scanning method. This method corresponds to the channel scan process 404 of FIG. 4. The method begins at step 602. At step 604, the method retrieves the value for SRI passed from the adaptive scan rate evaluation process 402 (FIG. 4). SRI is an integer having a value in the range of 0 to 3.

At step 606, the method checks the current value of the channel scan timer and at step 608 determines if the channel scan timer is 0 or has otherwise elapsed. In the illustrated embodiment of FIG. 1, the controller 112 implements the channel scan timer using clock signals received from the clock 120. The timer is implemented by, for example, storing a timer value in a register and decrementing the register every time a clock signal is received from the clock 120. When the register value reaches 0, the timer has elapsed, which will be detected at step 608. The method remains in a loop including steps 606 and 608 until the timer elapses.

At step 610 the channel scan timer is reset to a next scan timer value. In the illustrated embodiment, the next scan timer value is set according to the equation $$\text{next scan timer value} = 2^{SRI+K}.$$

This value sets the interval between the current channel scan and the next channel scan. K is an application dependent constant and may have a value of, for example, 5. The value for the channel scan timer set during step 610 will be tested at step 608 during the next execution of the method illustrated in FIG. 6. Thus the channel scan interval and channel scan frequency are each adapted to the current radio environment of the system.

At step 612, it is determined if SSI was set equal to 1 during the adaptive scan rate evaluation process of FIG. 5. If not, at step 614, the mobile station will scan all carriers for available channels and record the scanned data in the channel history database. The method then terminates at step 620. If SSI was set equal to 1 during the adaptive scan rate evaluation process, then a short scan is performed. At step 616, the mobile station scans for available channels only on the fist two carriers at the edge of the turn frequency band. Such a short scan is dictated by FCC rules when the mobile station determines that there are LBT channels available on the first two carriers. The short scan locates the LBT channels and stores channel interference, quality and RSSI information for subsequent evaluation and channel selection.

From the foregoing it can be seen that the present embodiment provides an improved method and apparatus for channel scanning in a TDMA radio communication system. The scan rate in accordance with the disclosed embodiment is adaptive to the present radio environment. A scan rate interval is set in response to that environment and used to control the duration between subsequent channel scans. In this manner, the scan rate can be increased during times of high channel noise or high risk of dropping a call and the scan rate can be decreased when appropriate to extend the battery life.

While a particular embodiment of the present invention has been shown and described, modifications may be made. It is therefore intended in the appended claims to cover all such changes and modifications which follow in the true spirit and scope of the invention.

What is claimed is:

1. A channel scanning method for a radio communication system having a plurality of frequency carriers with a plurality of radio channels, the method comprising:
    (a) detecting an operating environment of a handset in the radio communication system;
    (b) setting a scan rate interval and a short scan indicator in response to said operating environment, wherein the scan rate interval is used to control the duration of a scan interval and the short scan indicator is used to determine the number of said plurality of frequency carriers scanned by said handset and the value of the scan rate interval and the value of the short scan indicator are dynamically adjusted in response to said operating environment; and
    (c) based on the value of said short scan indicator, scanning either the plurality of frequency carriers or a predetermined subset of said plurality of frequency carriers for channels that are available in said plurality of radio channels for use by said handset.

2. The channel scanning method of claim 1 wherein step (a) further comprises identifying a base station of the radio communication system to which the handset is currently locked.

3. The channel scanning method of claim 2 wherein step (a) further comprises measuring received signal strength information (RSSI).

4. The channel scanning method of claim 1 wherein step (b) further comprises decreasing the duration of a scan interval when the handset is engaged in an active call by setting the scan rate interval at a minimum value.

5. The channel scanning method of claim 1 wherein step (b) further comprises decreasing the duration of a scan interval when handover from one base station to another base station of the system is possible for the handset by setting the scan rate interval at a minimum value.

6. The channel scanning method of claim 1 wherein step (b) further comprises:
    (b1) determining a number of listen before talk (LBT) channels available;
    (b2) comparing the number of LBT channels with a first threshold; and
    (b3) when the number of LBT channels exceeds the first threshold, setting the scan rate interval at a maximum value.

7. The channel scanning method of claim 6 further comprising:
    (b4) enabling a short scan routine by setting the short scan indicator to scan a reduced number of said plurality of frequency carriers.

8. The channel scanning method of claim 7 wherein the scanning of the predetermined subset of said plurality of frequency carriers is done during the short scan routine.

9. The channel scanning method of claim 7 further comprising:
    (b5) when the number of LBT channels exceeds the first threshold and a second threshold across said plurality of frequency carriers, setting the scan rate interval at an intermediate value.

10. The channel scanning method of claim 9 further comprising:
    (b6) when the number of LBT channels exceeds the first threshold but does not exceed the second threshold, setting the scan rate interval at a value below the intermediate value established in step (b5).

11. The channel scanning method of claim 10 further comprising:

(b7) otherwise, setting the scan rate interval at a minimum value.

12. A channel scanning method for a radiotelephone operable in a time division multiple access radio communication system having a plurality of frequency carriers with a plurality of radio channels, the method comprising:

waiting for lapse of a channel scan timer;

determining a value for the short scan indicator in response to a number of listen before talk (LBT) channels available on said plurality of frequency carriers;

in response to the short scan indicator having a first value, performing a scan of a limited set of said plurality of frequency carriers for channels that are available in said plurality of radio channels; and in response to the short scan indicator having a second value, performing a scan of said plurality of frequency carriers for channels that are available in said plurality of radio channels.

13. The channel scanning method of claim 12 further comprising:

comparing a received signal strength indication (RSSI) for a current base station with the RSSI for an adjacent base station; and when the RSSI for the adjacent base station exceeds the RSSI for the current base station by a predetermined amount, reducing the channel scan timer to a minimum value.

14. The channel scanning method of claim 12 further comprising determining a value for the channel scan timer in response to the number of LBT channels available on said plurality of frequency carriers.

15. The channel scanning method of claim 14 further comprising:

when a substantial number of LBT channels are available on said plurality of frequency carriers near a predetermined frequency band edge, setting the value for the channel scan timer to a maximum value; and when a substantial number of LBT channels are available on said plurality of frequency carriers across the frequency band, reducing the channel scan timer to an intermediate value.

16. A radiotelephone comprising:

a clock;

a receiver tunable to a plurality of frequency carriers with a plurality of radio channels; and a controller coupled to the receiver to control tuning of the receiver and coupled to the clock to establish a channel scan timer for controlling the time between scans of the plurality of frequency carriers for channels that are available in said plurality of radio channels by the receiver, the controller adjusting a duration of the channel scan timer in response to a number of listen before talk (LBT) channels detected by the receiver, and wherein the controller is configured to adjust the duration of the channel scan timer to a maximum value when a substantial number of LBT channels are available on said plurality of frequency carriers near a predetermined frequency band edge.

17. The radiotelephone of claim 16 wherein the controller is configured to adjust the duration of the channel scan timer to a value below the maximum value when a number of available LBT channels on said plurality of frequency carriers exceeds a first threshold but does not exceed a second threshold.

18. The radiotelephone of claim 17 wherein the controller is configured to adjust the duration of the channel scan timer to an intermediate value when the number of available LBT channels on said plurality of frequency carriers exceeds the second threshold.

\* \* \* \* \*